US010670729B2

(12) United States Patent
de Groot et al.

(10) Patent No.: US 10,670,729 B2
(45) Date of Patent: Jun. 2, 2020

(54) SYSTEM AND METHOD TO PROVIDE AN ASIL QUALIFIER FOR GNSS POSITION AND RELATED VALUES

(71) Applicant: NovAtel Inc., Calgary (CA)

(72) Inventors: Lance de Groot, Calgary (CA); Zoltan Molnar, Calgary (CA)

(73) Assignee: NovAtel Inc., Calgary, AB (CA)

( * ) Notice: Subject to any disclaimer, the term of this patent is extended or adjusted under 35 U.S.C. 154(b) by 320 days.

(21) Appl. No.: 15/680,450

(22) Filed: Aug. 18, 2017

(65) Prior Publication Data

US 2019/0056510 A1    Feb. 21, 2019

(51) Int. Cl.
 *G01S 19/20* (2010.01)

(52) U.S. Cl.
 CPC .................. *G01S 19/20* (2013.01)

(58) Field of Classification Search
 CPC ........... G01S 19/08; G01S 19/09; G01S 19/20
 USPC .................................... 342/357.58
 See application file for complete search history.

(56) References Cited

U.S. PATENT DOCUMENTS

| 7,783,425 B1 | 8/2010 | Hwang et al. |
| 2005/0052319 A1 | 3/2005 | Hatch et al. |

FOREIGN PATENT DOCUMENTS

WO    2017080556    5/2017

OTHER PUBLICATIONS

Worner M. et al. "Integrity for autonomous driving: a survey" 2016 IEEE/Ion Position, Location and Navigation Symposium (PLANS), IEEE, Apr. 11, 2016, pp. 666-671.

Ray J. K. et al., "High Integrity GPS-SBAS Receiver Using Innovative Correlator and Software Approach for Avionics Applications." GNSS 2004—Proceedings of the 17th International Technical Meeting of the Satellite Division of the Institute of Navigation (ION GNSS 2004), Sep. 24, 2004, pp. 1539-1546.
Extended European Search Report dated Feb. 11, 2019 for European Patent Application No. 18184565.2 for NovAtel, Inc., 9 pages.
Chang, X.W., Paige C.C., Perepetchai V. (2001) Integrity methods using carrier phase. In Proceedings of International Symposium on Kinematic Systems in Geodesy, Geomatics and Navigation (KIS 2001), Banff, Jun. 5-8, pp. 235-245.

(Continued)

*Primary Examiner* — Dao L Phan
(74) *Attorney, Agent, or Firm* — Cesari and McKenna, LLP (57) ABSTRACT

A system and method provides an Automotive Safety Integrity Level (ASIL) qualifier for Global Navigation Satellite System (GNSS) position and related values. Specifically, hardware platform diagnostics are executed on one or more platforms associated with a GNSS Position Sensor (GNSSPS) that calculates/obtains position and/or related values. Also, a Receiver Autonomous Integrity Monitoring (RAIM) algorithm is executed on the calculated/obtained position and/or related values. If the results both produce a "good" qualifier, the position and/or related values is assigned an ASIL qualifier of "good" and may be utilized by an ASIL rated system. If either of the qualifiers is a "bad" qualifier, the position and/or related values is assigned an ASIL qualifier of "bad" and cannot be utilized by the ASIL rated system. In addition, the inventive system and method may compute a probability associated with an integrity violation of the RAIM algorithm which may consider the probability of hardware failure.

20 Claims, 5 Drawing Sheets

(56) References Cited

OTHER PUBLICATIONS

Feng, S., Ochieng, W., Samson, J., Tossaint, M., Hernandez-Pajares, M., Juan, J.M., Sanz, J., Aragon-Angel, A., Ramos, P., Jofre, M. (2010). Integrity Monitoring for Carrier Phase Ambiguities. In Proceedings of the 23rd International Technical Meeting of the Satellite Division of the Institute of Navigation (ION GNSS 2010), Portland, OR, September, pp. 2148-2159.

Walter, T., & Enge, P. (1995). Weighted RAIM for precision approach. In Proceedings of ION GPS, September, vol. 8, pp. 1995-2004.

Brown, R. G. and Chin, G. Y.. (1997) "GPS RAIM: calculation of threshold and protection radius using chi-square methods—a geometric approach," Global Positioning System: Institute of Navigation, vol. 5, pp. 155-179.

Brown, R.G. (1992) "A baseline GPS RAIM scheme and a note on the equivalence of three RAIM methods." Navigation 39.3, pp. 301-316.

ISO 26262:2011 "Road Vehicles Functional Safety".

SYSTEM AND METHOD TO PROVIDE AN ASIL QUALIFIER FOR GNSS POSITION AND RELATED VALUES

BACKGROUND

Technical Field

The invention relates generally to global navigation satellite systems (GNSS), and in particular, to a system and method that provides an Automotive Safety Integrity Level (ASIL) qualifier for GNSS position and other related values.

Background Information

Safety critical elements in automotive applications have an associated Automotive Safety Integrity Level (ASIL) rating, linked to the acceptable probability of failure of the element that is capable of creating a risk for the vehicle, its driver, or the environment. Today's vehicles have many such ASIL rated elements that communicate parameters between each other. Emerging automotive applications such as an automated driving system (ADS) and an advanced driver assistance system (ADAS) require the absolute position and related values (velocity, heading of motion, time measurements) to be ASIL rated. However, the GNSS position and related values, which are calculated/obtained based on signals received from GNSS satellites, are difficult to validate such that they can be used by ASIL rated systems due to the large number of error sources that may affect the signals received from the GNSS satellites.

SUMMARY

The inventive system and method provides an Automotive Safety Integrity Level (ASIL) qualifier for Global Navigation Satellite System (GNSS) position and related values. Specifically, hardware platform diagnostics are executed on the one or more platforms associated with a GNSS Position Sensor (GNSSPS) that calculates/obtains the position and/or related values. In addition, a Receiver Autonomous Integrity Monitoring (RAIM) algorithm is executed on the position and/or related values. The execution of the RAIM algorithm includes a fault detection and exclusion (FDE) component and the computation of a protection level. If the results of the execution of the hardware platform diagnostics and the RAIM algorithm both produce a "good" qualifier, the position and/or related values are assigned an overall qualifier indicating the suitability of the output for use in an ASIL rated system, referred to herein as an ASIL qualifier of "good." As such, the position and/or related values are deemed valid and may be utilized by the ASIL rated system, such as an automated driving system (ADS) or an advanced driver assistance system (ADAS). However, if either of the qualifiers is a "bad" qualifier, the position and/or related values are assigned an ASIL qualifier of "bad." As such, the position and/or related values are deemed invalid and cannot be utilized by the ASIL rated system. Advantageously, it can be determined whether the calculated/obtained position and/or related values may be utilized by the ASIL rated system.

In addition, the inventive system and method may compute a probability associated with an integrity violation of the RAIM algorithm. Specifically, a fault tree may be utilized to compute the probability that the true error exceeds the protection level computed for the RAIM algorithm. The computed probability may then be utilized as input for the hardware platform diagnostics. Alternatively, the inventive system and method may compute the probability that the true error exceeds the protection level computed for the RAIM algorithm utilizing a fault tree that also considers the impact of one or more hardware platform failures. Regardless of the way in which the error probabilities are combined, the resulting overall probability may then be compared to the requirements of the ASIL rating assigned to the system (e.g., A, B, C, or D) to then determine if the system satisfies the requirements of the assigned ASIL rating.

BRIEF DESCRIPTION OF THE DRAWINGS

The description below refers to the accompanying drawings, of which.

DETAILED DESCRIPTION OF AN ILLUSTRATIVE EMBODIMENT

Figure 1:
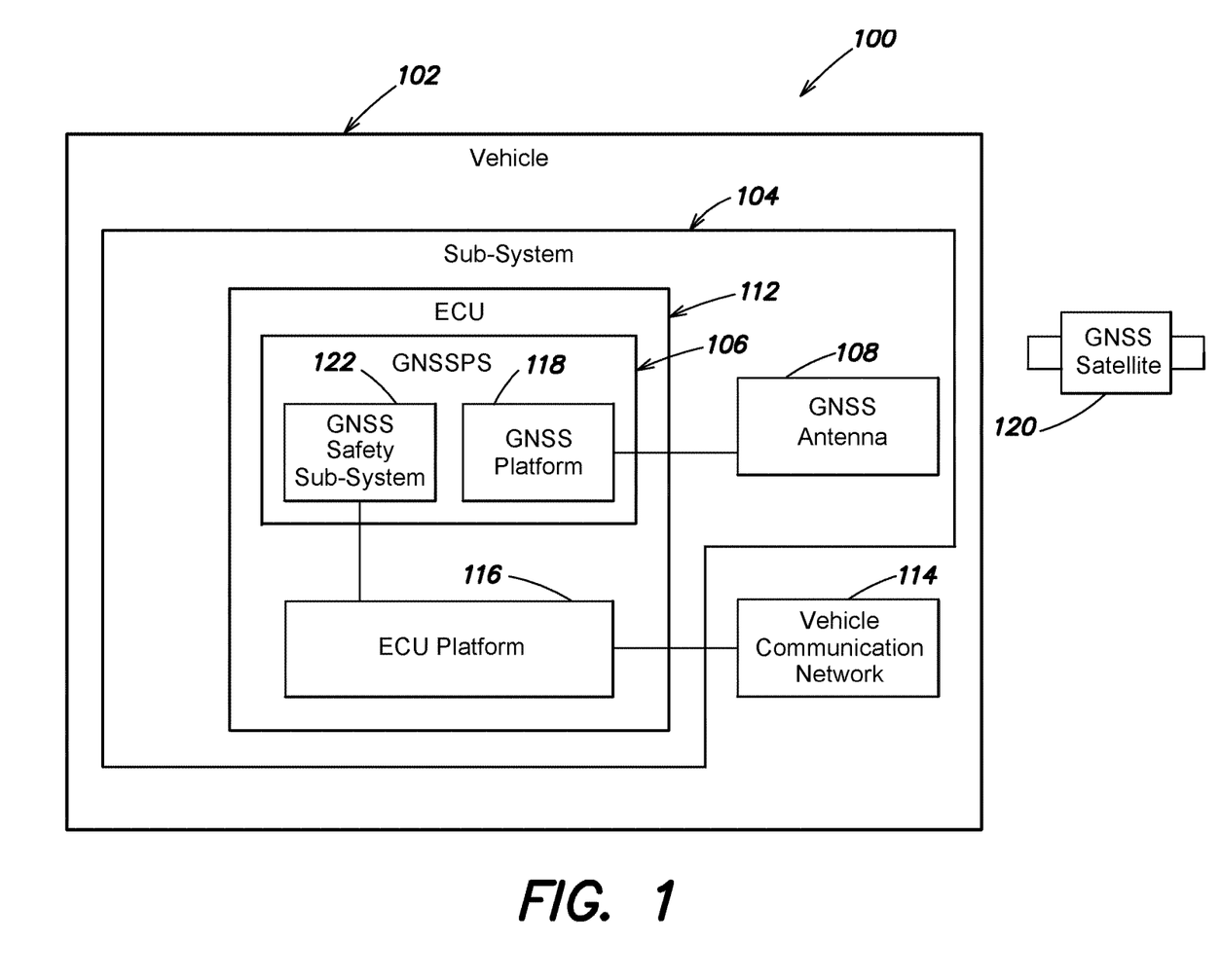
FIG. 1 illustrates a system in accordance with an illustrative embodiment of the invention.

Referring to FIG. 1, a system 100 includes a vehicle 102 that includes a sub-system 104, such as an automated driving system (ADS) or an advanced driver assistance system (ADAS), and a vehicle communication network 114. The sub-system 104 includes an Electronic Control Unit (ECU) 112 and an antenna 108. The ECU 112, which is coupled to the antenna 108, includes a Global Navigation Satellite System Position Sensor (GNSSPS) 106 and an ECU platform 116. The GNSSPS 106 includes a GNSS safety sub-system 122 and a GNSS platform 118. In an embodiment, the sub-system 104 is required to comply with a safety standard, such as, but not limited to, the Automotive Road Vehicles-Functional Safety Standard ISO 26262 that provides requirements for validation and confirmation measures to ensure a sufficient and acceptable level of safety is being achieved. In addition, ISO 26262 defines the Automotive Safety Integrity Level (ASIL) that is a risk classification scheme that helps define the safety requirements. In order to receive a particular ASIL rating, the system must meet the requirements of that particular ASIL rating (e.g., ASIL B).

The antenna 108 receives one or more GNSS satellite signals from one or more GNSS satellites 120. The GNSSPS 106 calculates the absolute position based on the timing of ranging codes and carrier signals in the satellite signals received at the antenna 108, as known by those skilled in the art. Further, the GNSSPS 106 may calculate or obtain other related values, such as, but not limited to, velocity, heading of motion, and/or time measurements that may be provided to a sensor fusion sub-system (not shown) of the sub-system 104, as known by those skilled in the art. In addition, the GNSSPS 106 may obtain and provide range measurements (pseudorange, carrier phase) and ephemeris information to support a tightly or deeply coupled Inertial Navigation System (INS) (not shown) implementation in the sensor fusion sub-system (not shown).

The ECU 112 is configured to interface with the vehicle communication network 114. Further, the GNSS safety sub-system 122, of the ECU 112, includes processing logic that is configured to implement one or more embodiments as described herein. Specifically, the GNSS safety sub-system 122 may assign an ASIL qualifier to the output of the GNSSPS 106 based on execution of hardware platform diagnostics and the RAIM algorithm as described in further detail below. In addition, and as described in further detail below, the ECU platform 116 and GNSS platform 118 may execute platform specific diagnostics (e.g., hardware and software) that are utilized to implement one or more embodiments described herein.

Figure 2:
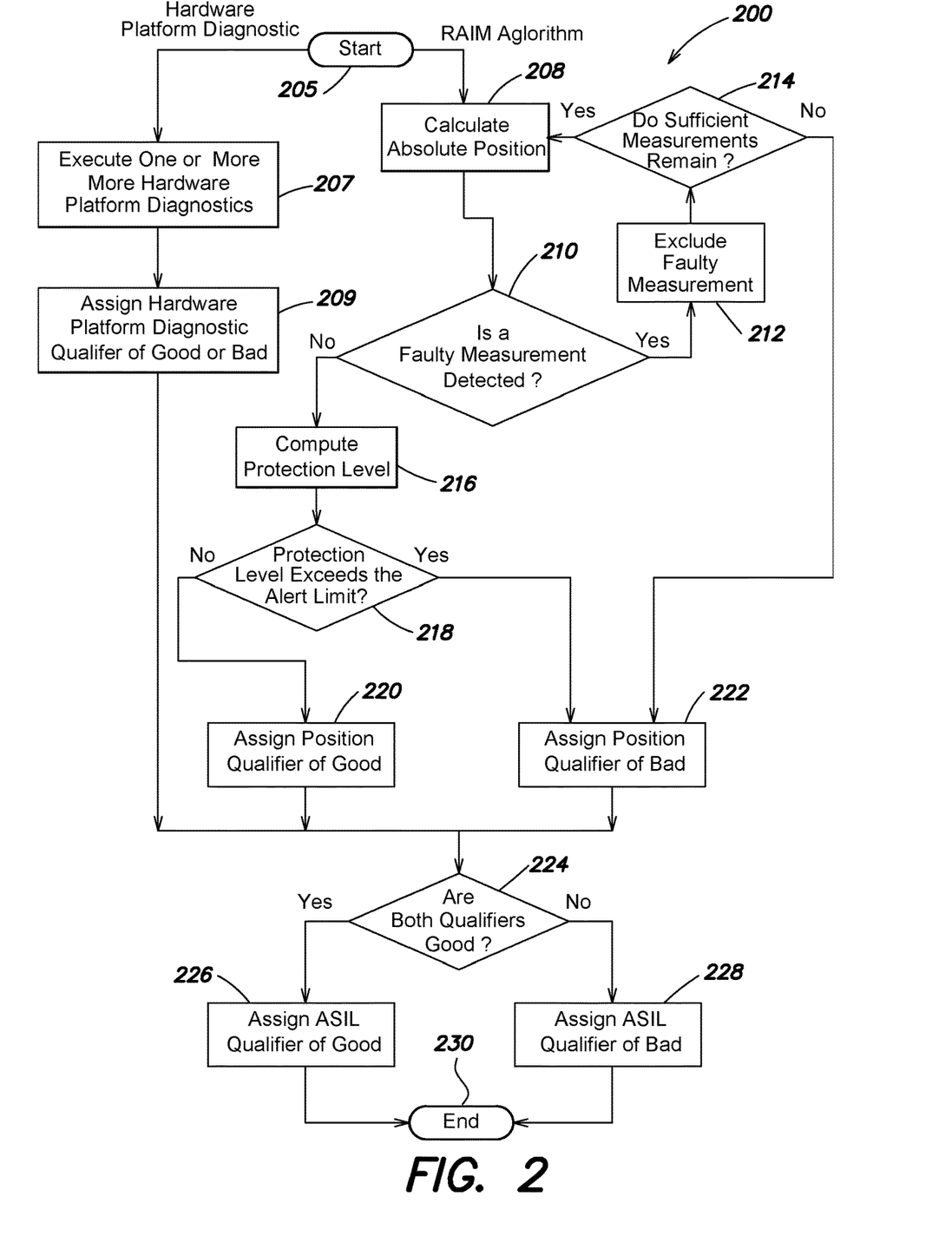
FIG. 2 is an exemplary flow chart for the operation of the system of FIG. 1.

FIG. 2 is an exemplary flow chart of the operation of the system and method for assigning an ASIL qualifier to the output of the GNSSPS. The procedure 200 starts at step 205 and continues to steps 207 and 208 to respectively implement the hardware platform diagnostic and the RAIM algorithm. Specifically, the hardware platform diagnostic and the RAIM algorithm may be implemented in parallel. More specifically, the hardware platform diagnostic, consisting of GNSS and ECU platform diagnostics, may be implemented continuously, while the RAIM algorithm may be implemented when the GNSSPS 106 calculates a particular value (e.g., absolute position) to be potentially utilized by sub-system 104 that is an ADS or an ADAS.

At step 207, one or more hardware platform diagnostics are executed on the GNSS platform 118 and ECU platform 116 of the GNSSPS 106 that obtains the data (e.g., absolute position). The hardware platform diagnostics may be executed by the GNSS platform 118 and ECU platform 116 to protect against hardware failures or "soft" errors, which could affect position and/or related values or the range measurements and ephemeris output by the GNSSPS 106. For example, the hardware platform diagnostics may include, but are not limited to, random access memory (RAM) tests, central processing unit (CPU) register tests, program flow monitoring device readbacks, etc., as known by those skilled in the art. It is noted that the hardware Failure Modes, Effects and Diagnostics analysis (FMEDA) may be utilized to determine which hardware diagnostics are executed by the GNSS platform 118 and ECU platform 116.

The procedure continues to step 209 and a hardware platform diagnostic qualifier is assigned to the hardware platform, including the GNSS platform 118 and ECU platform 116, based on the execution of the hardware platform diagnostics. For example, if the GNSS platform 118 and ECU platform 116 pass the one or more hardware platform diagnostics, the GNSS safety sub-system 122 may assign a qualifier of "good" as the hardware platform diagnostic qualifier. However, if the GNSS platform 118 or ECU platform 116 fails at least one hardware platform diagnostics, the GNSS safety sub-system 122 may assign a qualifier of "bad" as the hardware platform diagnostic qualifier.

At step 208, an absolute position is calculated that is utilized for execution of the RAIM algorithm. Specifically, the GNSSPS 106 calculates an absolute position based on the GNSS satellite signals received at the antenna 108. The procedure continues to step 210 where the fault detection and exclusion (FDE) component of the RAIM algorithm is executed to determine whether the calculated absolute position contains a faulty measurement. Specifically, the GNSS safety sub-system 122 executes the FDE component of the RAIM algorithm to identify cases where there is a faulty measurement, as known by those skilled in the art. For example, a statistical test may be performed on the residuals of the calculated absolute position. In the absence of faulty measurements, the quadratic form of the residual vector follows a chi-squared distribution with a number of degrees of freedom equal to the observations minus the unknown, as known by those skilled in the art. Therefore, a threshold may be set for a given probability of "false alarms," and if the test statistic exceeds the threshold, the solution is considered to contain a faulty measurement.

When it is determined that the calculated absolute position contains a faulty measurement at step 210, the procedure continues to step 212 and a faulty measurement is identified and excluded, as known by those skilled in the art. For example, the measurement with the greatest normalized residual may be the measurement selected to be excluded by the GNSS safety sub-system 122. The procedure continues to step 214 and it is determined if sufficient measurements remain to calculate the absolute position again. If sufficient measurements remain, the procedure continues to step 208 and the absolute position is calculated again and the procedure continues until all faulty measurements, capable of being detected, are excluded. If sufficient measurements do not remain to calculate the absolute position, the procedure continues to step 222 and the GNSS safety sub-system 122 assigns a qualifier of "bad" as the position qualifier for the absolute position.

When it is determined that the calculated absolute position does not contain a faulty measurement at step 210, the procedure continues to step 216 and a protection level is computed for the calculated absolute position that is free of detectable faulty measurements. Illustratively, the GNSS safety sub-system 122 computes the protection level. The protection level, as known by those skilled in the art, is an estimate of the maximum error potentially present in the calculated absolute position from undetectable faulty measurements. It is noted that the protection level may be specified separately for a horizontal component (i.e., horizontal protection level) and a vertical component (i.e., vertical protection level). For example, and as known by those skilled in the art, the protection level may be computed as the projection into the position domain of the largest measurement bias which is undetectable by a statistical test on the residuals, as described above with respect to step 210. The projection is made assuming the bias is on the measurement which most strongly impacts the position at a given epoch.

The procedure continues to step 218 and it is determined if the protection level exceeds an alert limit. Specifically, the GNSS safety sub-system 122 compares the protection level to the alert limit, wherein the protection level and alert limit may both be on the order of centimeters (cm), meters (m), or some other unit of measure. In an embodiment, the alert limit is a parameter of the system design and may be set at a maximum position error that sub-system 104 can tolerate. For example, if the absolute position is being utilized for automated parking that requires accuracy on the level of cms, the alert limit may be set to 1 cm, 2 cm, or some other accuracy value. However, if the absolute position is being utilized in conjunction with a map to determine which road the vehicle 102 is traveling on, the alert limit may be set to 5 m, 8 m, or some other accuracy value. That is, the alert limit may be selected based on how the output of the GNSSPS 106 is to be utilized by the sub-system 104.

Figure 3A:
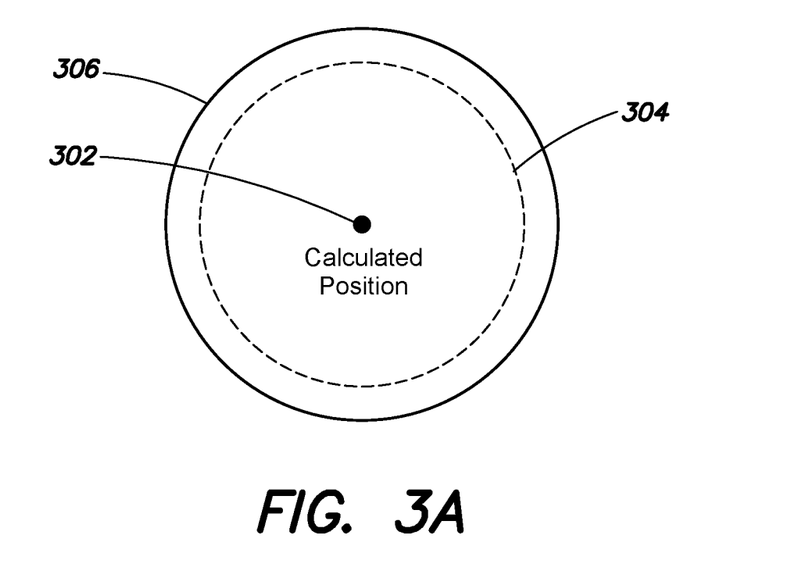
FIG. 3A illustrates a protection level for the RAIM algorithm that does not exceed an alert limit.

If at step 218 it is determined that the protection level does not exceed the alert limit, the procedure continues to step 220 and a qualifier of "good" is assigned as the position qualifier for the calculated absolute position. Specifically, the GNSS safety sub-system 122 may assign the qualifier of "good" as the position qualifier. FIG. 3A illustrates the protection level not exceeding the alert limit. Specifically, the calculated absolute position at 302 is utilized to calculate the protection level that is represented as a dashed circle 304 having a radius equal to the maximum possible error. The solid circle 306 represents the alert limit indicating the maximum position error the sub-system 104 can tolerate. As can be seen in FIG. 3A, the dashed circle 304 representing the protection level does not exceed the solid circle 306 representing the alert limit.

Figure 3B:
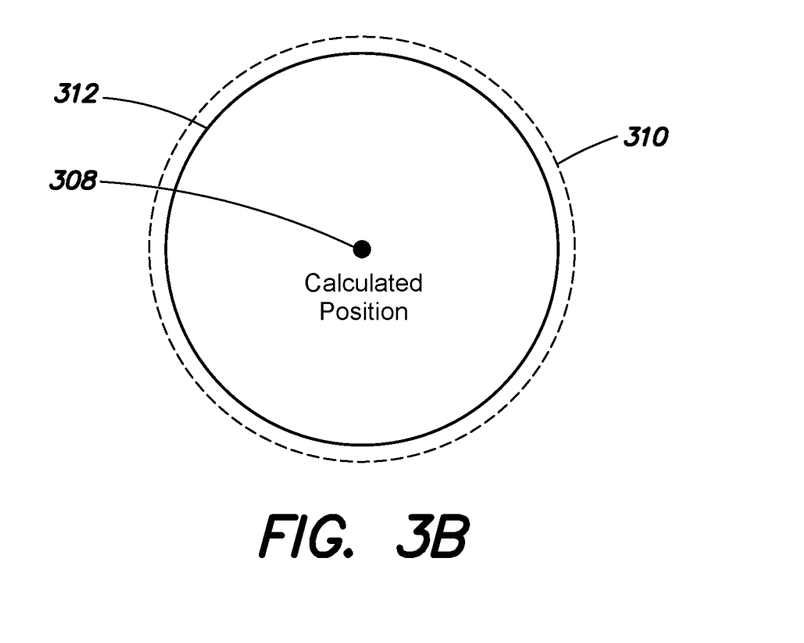
FIG. 3B illustrates a protection level for the RAIM algorithm that exceeds an alert limit.

If at step 218 the protection level exceeds the alert limit, the procedure continues to step 222 and the GNSS safety sub-system 122 assigns a qualifier of "bad" as the position qualifier for the calculated absolute position. FIG. 3B illustrates the protection level exceeding the alert limit. Specifically, the calculated absolute position at 308 is utilized to calculate the protection level that is represented as a dashed circle 310 having a radius equal to the maximum possible error. The solid circle 312 represents the alert limit indicating the maximum position error the sub-system 104 can tolerate. As can be seen in FIG. 3B, the dashed circle 310 representing the protection level exceeds the solid circle 312 representing the alert limit.

After a hardware platform diagnostic qualifier and a position qualifier have both been assigned, the procedure continues to step 224, and it is determined if both assigned qualifiers are "good." If at step 224 it is determined that both assigned qualifiers are "good," the procedure continues to step 226 and a qualifier of "good" is assigned as the ASIL qualifier indicating that the absolute position is valid and can be utilized by the sub-system 104. However, if at step 224 it is determined that either of the qualifiers is "bad," the procedure continues to step 228 and a qualifier of "bad" is assigned as the ASIL qualifier indicating that the absolute position is invalid and cannot be utilized by the sub-system 104. At step 230, the procedure ends.

Although the example as discussed with reference to FIG. 2 describes assigning an ASIL qualifier for the absolute position calculated by the GNSSPS 106, it is expressly contemplated that other related values, such as, but not limited velocity, heading of motion, and/or time measurements may be assigned an ASIL qualifier in a similar manner as described above. In addition or alternatively, the range measurements (pseudorange, carrier phase) and ephemeris information obtained by the GNSSPS 106 may be assigned an ASIL qualifier in a similar manner as described above. Specifically, the hardware platform diagnostics and the RAIM algorithm may be executed as described above to assign an ASIL qualifier to the other related values.

Figure 4:
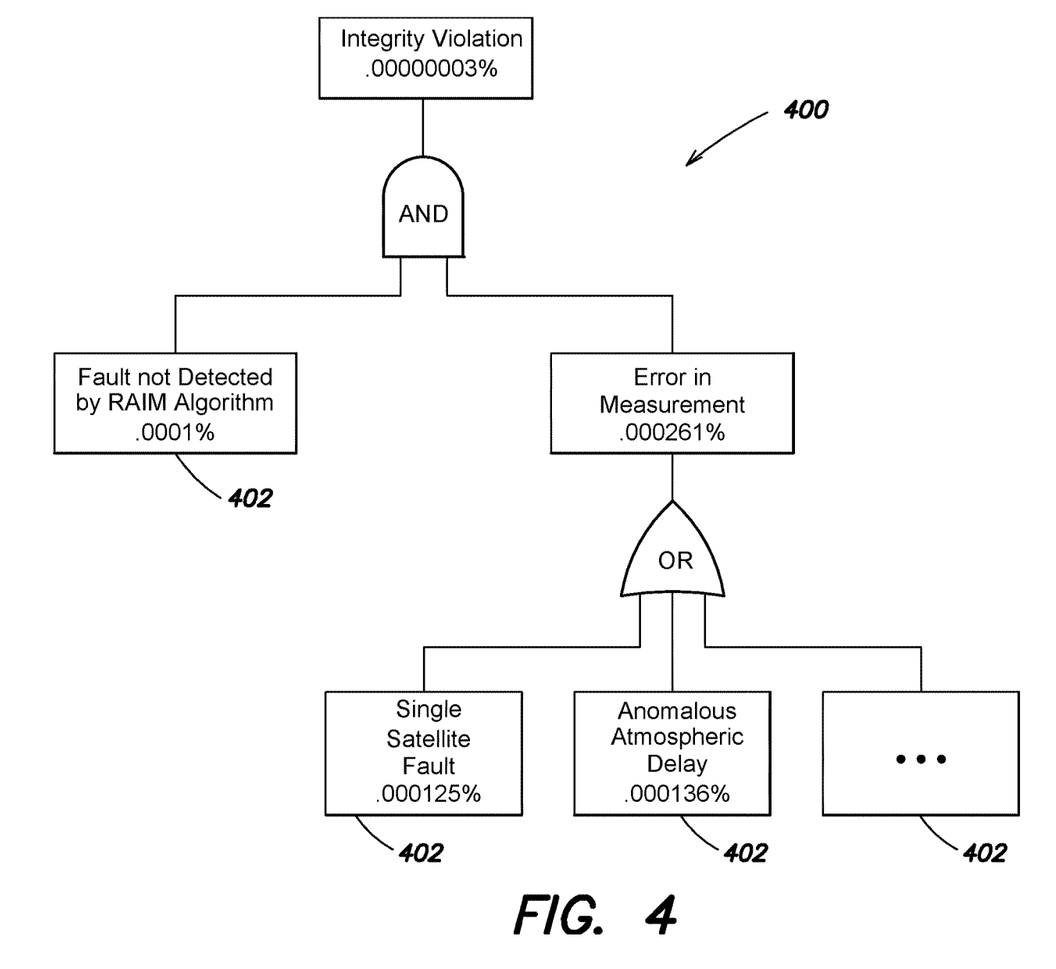
FIG. 4 is an exemplary fault tree that may be utilized with the operation of the system of FIG. 1.

FIG. 4 shows a simplified example of a fault tree 400 utilized for computing a probability associated with an integrity violation of the RAIM according to one or more embodiments described herein. As described herein, an integrity violation occurs when the true error exceeds the computed protection level for the RAIM algorithm. As depicted in FIG. 4, the fault tree 400 includes a plurality of nodes 402, where each node is associated with a failure from a different source. Within each node 402 is a value representing the probability of the failure from the different source. For example and with reference to FIG. 4, the probability that a fault was not detected by the RAIM algorithm is 0.0001%. In addition, the probability of an unexpected error on one or more GNSS measurements, such as single satellite fault and an anomalous atmospheric delay, are respectively 0.000125% and 0.000136%. Therefore, the probability of an error in the solution is 0.000261% (0.000125%+0.000136%). The probabilities as depicted in FIG. 4 are for illustratively purposes only and may be derived in a variety of ways as known by those skilled in the art.

Therefore, and based on the particular sources of failures and their probabilities as depicted in FIG. 4, the probability of an integrity violation, e.g., that the true error exceeds the computed protection level, is 0.00000003% (0.000261%× 0.0001%). The output probability of an integrity violation, in this example 0.00000003%, may then be utilized as input to the analysis of the hardware failure rate, e.g., an FMEDA. This analysis provides the evidence that the output of the GNSSPS 106 meets the requirements of the assigned ASIL rating. Additionally, this analysis is used to identify the hardware platform diagnostics which are to be executed at step 207 of FIG. 2. Specifically, the output probability, which represents the integrity risk of the RAIM algorithm, may be included as input to the hardware platform analysis to guarantee satisfaction of the requirements of the ASIL rated sub-system 104. In addition, although FIG. 4 depicts the sources of the failures being from a fault not being detected by the RAIM algorithm, a single satellite fault, and an anomalous atmospheric delay, it is expressly contemplated that any of a variety of different/additional sources may be utilized in the fault tree as depicted in FIG. 4.

Figure 5:
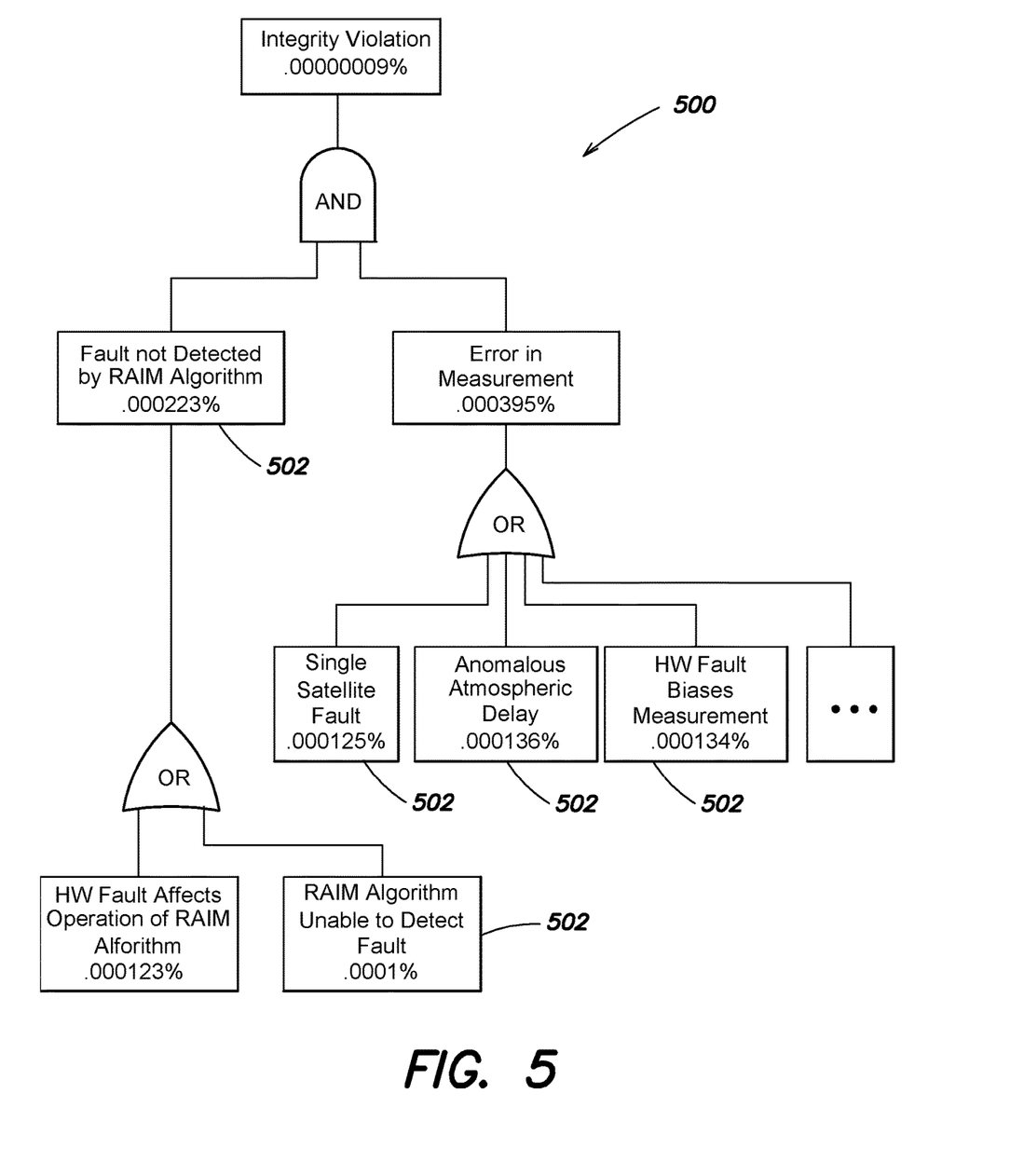
FIG. 5 is an exemplary fault tree that considers the impact of hardware platform failure(s) and may be utilized with the operation of the system of FIG. 1.

FIG. 5 shows a simplified example of a fault tree 500, that considers the impact of one or more hardware platform failures, utilized for computing a probability associated with an integrity violation of the RAIM algorithm according to one or more embodiments described herein. The fault tree 500 includes the failure from the different source as depicted in FIG. 4 but also includes the impact of the one or more hardware platform failures. Failure of the hardware platform can contribute to the integrity risk in a variety of ways. For example, a hardware platform failure might lead directly to an error in a measurement, e.g., in the case of a memory soft error affecting a stored value. In addition or alternatively, a hardware platform failure may cause incorrect operation of the RAIM algorithm, causing it to fail to detect an error which would have otherwise been detected, e.g., through incorrect program flow.

As depicted in FIG. 5, the fault tree 500 includes a plurality of nodes 502, where each node is associated with a failure from a different source that includes potential hardware platform failures. Each node 502 includes a value representing the probability of the failure from the different source. For example and with reference to FIG. 5, the probability that the RAIM algorithm was unable to detect a fault is 0.0001%. In addition, the probability of an unexpected error on one or more GNSS measurements, such as single satellite fault and an anomalous atmospheric delay, are respectively 0.000125% and 0.000136%. Further, the probability of a hardware platform fault that affects the operation of the RAIM algorithm is 0.000123% and the probability that a hardware platform fault biases a measurement is 0.000134%. Therefore, the probability of an error in the solution, that includes the impact of potential hardware platform failures, is 0.000395% (0.000125%+0.000136%+ 0.000134%). In addition, the probability that the fault is not detected by the RAIM algorithm, that includes the impact of potential hardware platform failures, is 0.000223% (0.0001%+0.000123%).

Therefore, and based on the particular sources of failures and their probabilities as depicted in FIG. 5 that includes the impact of potential hardware platform failures, the probability of an integrity violation, e.g., that the true error exceeds the computed protection level, is 0.00000009%

(0.000223%×0.000395%). The computed probability may be compared with the requirements of the ASIL rating (e.g., A, B, C, or D) assigned to the sub-system 104 to determine if the system meets the requirements of the assigned ASIL rating. For example, if the computed probability meets the requirements of the ASIL rating of B, the sub-system 104 may be determined to comply with an ASIL rating of B. However, if the computed probability meets the requirements of the ASIL rating of D, the sub-system 104 may be determined to comply with an ASIL rating of D. Although FIG. 5 depicts particular sources of failures, it is expressly contemplated that any of a variety of different/additional sources may be utilized in the fault tree as depicted in FIG. 5.

The foregoing description described certain example embodiments. It will be apparent, however, that other variations and modifications may be made to the described embodiments, with the attainment of some or all of their advantages. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:

1. A system comprising:
    a sensor configured to obtain data;
    one or more processors configured to:
        execute one or more hardware platform diagnostics on one or more platforms associated with the sensor to determine if the one or more platforms pass or fail the one or more hardware platform diagnostics,
        assign a hardware platform good qualifier as a hardware platform qualifier when all of the one or more hardware platform diagnostics pass and assign a hardware platform bad qualifier as the hardware platform qualifier when at least one of the one or more hardware platform diagnostics fails,
        execute a Receiver Autonomous Integrity Monitoring (RAIM) algorithm on the data to compute at least a protection level,
        assign an output good qualifier as an output qualifier when the protection level does not exceed an alert limit and assign an output bad qualifier as the output qualifier when the protection level exceeds the alert limit,
        assign an Automotive Safety Integrity Level (ASIL) good qualifier as an ASIL qualifier when the output qualifier is assigned the output good qualifier and the hardware platform qualifier is assigned the hardware platform good qualifier, and
        assign an ASIL bad qualifier as the ASIL qualifier when the output qualifier is assigned the output bad qualifier or the hardware platform qualifier is assigned the hardware platform bad qualifier.

2. The system of claim 1 wherein the system is an automated driving system or an advanced driver assistance system, and the system only utilizes the data when the ASIL qualifier is assigned the ASIL good qualifier.

3. The system of claim 1, wherein the RAIM algorithm includes a fault detection and exclusion (FDE) component configured to remove, before the protection level is calculated for the data, faulty measurements that are detectable based on one or more statistical techniques.

4. The system of claim 1, wherein the alert limit is selected based on the manner in which the data is to be utilized.

5. The system of claim 1, wherein an integrity risk value is computed utilizing a fault tree, wherein each node of the fault tree represents a different source of failure and has an associated fault probability.

6. The system of claim 5, wherein the integrity risk value is utilized as input for the one or more hardware platform diagnostics.

7. The system of claim 5, wherein the fault tree considers an impact of one or more hardware platform failures.

8. The system of claim 7, wherein the integrity risk value is compared to one or more requirements associated with an assigned ASIL rating to determine if the system meets the assigned ASIL rating.

9. The system of claim 1, wherein the data includes one of an absolute position, velocity, heading of motion, time measurements, range measurements, and ephemeris information.

10. A method, comprising:
    obtaining data at a sensor;
    executing one or more hardware platform diagnostics on one or more platforms associated with the sensor to determine if the one or more platforms pass or fail the one or more hardware platform diagnostics;
    assigning a hardware platform good qualifier as a hardware platform qualifier when all of the one or more hardware platform diagnostics pass and assigning a hardware platform bad qualifier as the hardware platform qualifier when at least one of the one or more hardware platform diagnostics fails;
    executing a Receiver Autonomous Integrity Monitoring (RAIM) algorithm on the data to compute at least a protection level;
    assigning an output good qualifier as an output qualifier when the protection level does not exceed an alert limit and assigning an output bad qualifier as the GNSSPS output qualifier when the protection level exceeds the alert limit;
    assigning an Automotive Safety Integrity Level (ASIL) good qualifier as an ASIL qualifier when the output qualifier is assigned the output good qualifier and the hardware platform qualifier is assigned the hardware platform good qualifier; and
    assigning an ASIL bad qualifier as the ASIL qualifier when the output qualifier is assigned the output bad qualifier or the hardware platform qualifier is assigned the hardware platform bad qualifier.

11. The method of claim 10, further comprising utilizing the data by an automated driving system or an advanced driver assistance system only when the ASIL qualifier is assigned the ASIL good qualifier.

12. The method of claim 10, wherein the RAIM algorithm includes a fault detection and exclusion (FDE) component configured to remove, before the protection level is calculated for the data, faulty measurements that are detectable based on one or more statistical techniques.

13. The method of claim 10, wherein the alert limit is selected based on the manner in which the data is to be utilized.

14. The method of claim 10, wherein an integrity risk value is computed utilizing a fault tree, wherein each node of the fault tree represents a different source of failure and has an associated fault probability.

15. The method of claim 14, wherein the integrity risk value is utilized as input for the one or more hardware platform diagnostics.

16. The method of claim 14, wherein the fault tree considers an impact of one or more hardware platform failures.

17. The method of claim 16, wherein the integrity risk value is compared to one or more requirements associated with an assigned ASIL rating to determine if the sensor meets the assigned ASIL rating.

18. The method of claim 10, wherein the data includes one of an absolute position, velocity, heading of motion, time measurements, range measurements, and ephemeris information.

19. A system comprising:
A Global Navigation Satellite System Position Sensor (GNSSPS) configured to calculate an absolute position based on one or more satellite signals received at an antenna;
one or more platforms, associated with the GNSSPS, configured to:
execute one or more hardware platform diagnostics on the one or more platforms to determine if the one or more platforms pass or fail the one or more hardware platform diagnostics,
a GNSS safety sub-system, of the GNSSPS, configured to:
assign a hardware platform good qualifier as a hardware platform qualifier when all of the one or more hardware platform diagnostics pass and assign a hardware platform bad qualifier as the hardware platform qualifier when at least one of the one or more hardware platform diagnostics fails,
execute a Receiver Autonomous Integrity Monitoring (RAIM) algorithm on the absolute position to compute at least a protection level and remove faulty measurements,
assign a position good qualifier as a position qualifier when the protection level does not exceed an alert limit and assign a position bad qualifier as the position qualifier when the protection level exceeds the alert limit,
assign an Automotive Safety Integrity Level (ASIL) good qualifier as an ASIL qualifier when the position qualifier is assigned the position good qualifier and the hardware platform qualifier is assigned the hardware platform good qualifier, and
assign an ASIL bad qualifier as the ASIL qualifier when the position qualifier is assigned the position bad qualifier or the hardware platform qualifier is assigned the hardware platform bad qualifier.

20. The system of claim 19 wherein the system is an automated driving system or an advanced driver assistance system, and the system only utilizes the GNSSPS data when the ASIL qualifier is assigned the ASIL good qualifier.

* * * * *

UNITED STATES PATENT AND TRADEMARK OFFICE
CERTIFICATE OF CORRECTION

PATENT NO. : 10,670,729 B2  
APPLICATION NO. : 15/680450  
DATED : June 2, 2020  
INVENTOR(S) : Lance de Groot et al.

Page 1 of 1

It is certified that error appears in the above-identified patent and that said Letters Patent is hereby corrected as shown below:

In the Claims

Claim 10, Column 8, Line 35 reads:
"and assigning an output bad qualifier as the GNSSPS"
Should read:
"and assigning an output bad qualifier as the"

Claim 20, Column 10, Line 24 reads:
"system , and the system only utilizes the GNSSPS data when"
Should read:
"system , and the system only utilizes the data when"

Signed and Sealed this  
Twelfth Day of December, 2023

Katherine Kelly Vidal  
*Director of the United States Patent and Trademark Office*